Figure 1:
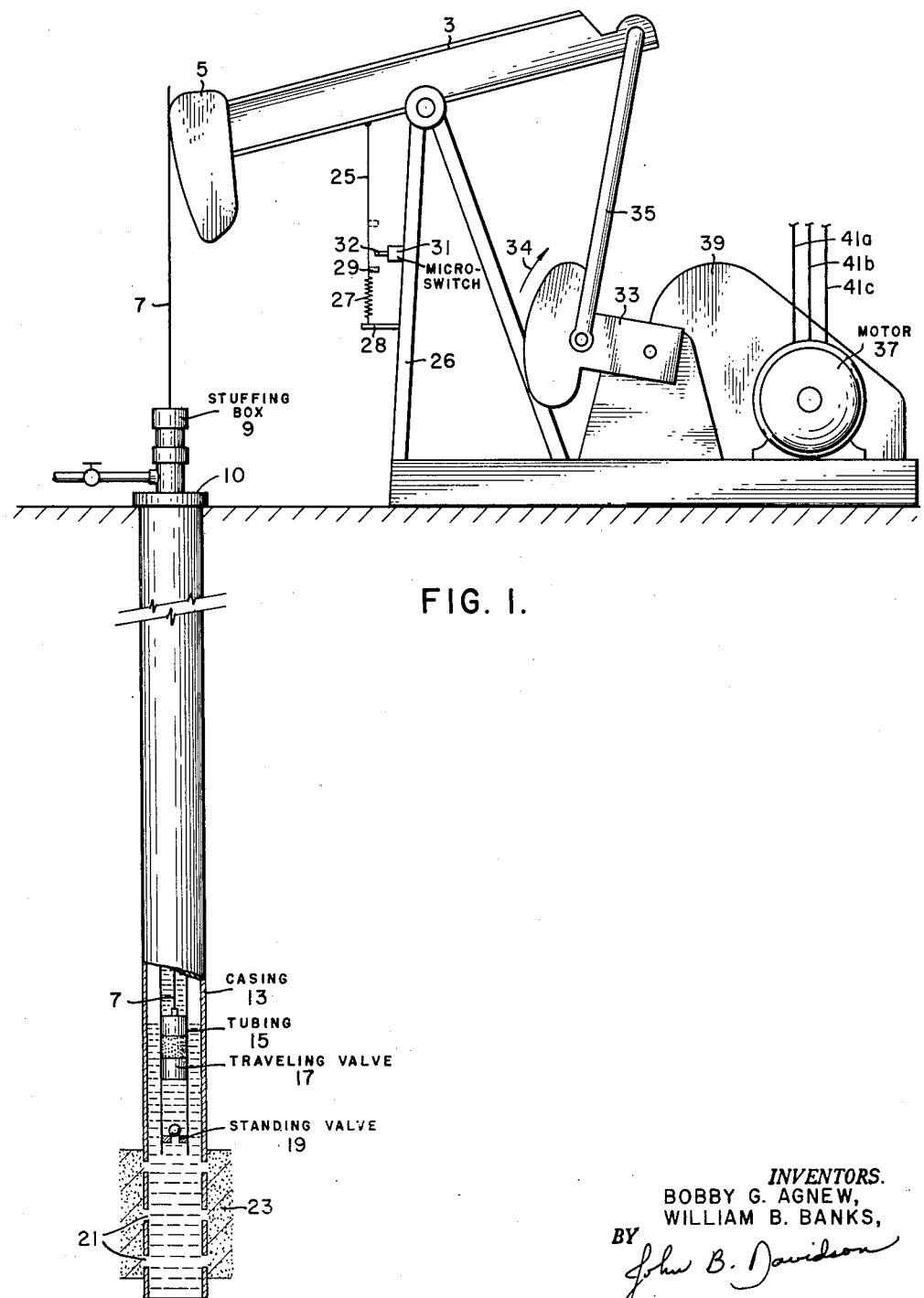

FIG. I.

Jan. 29, 1963   B. G. AGNEW ET AL   3,075,466
ELECTRIC MOTOR CONTROL SYSTEM
Original Filed Sept. 24, 1959   2 Sheets-Sheet 2

INVENTORS.
BOBBY G. AGNEW,
WILLIAM B. BANKS,
BY John B. Davidson
ATTORNEY.

United States Patent Office 3,075,466
Patented Jan. 29, 1963

3,075,466
ELECTRIC MOTOR CONTROL SYSTEM
Bobby G. Agnew, Monahans, and William B. Banks, Houston, Tex.; said Agnew assignor, by mesne assignments, to Jersey Production Research Company, Tulsa, Okla., a corporation of Delaware, and said Banks assignor to Automation Products, Inc., Houston, Tex., a corporation of Texas
Continuation of application Ser. No. 842,110, Sept. 24, 1959. This application Oct. 17, 1961, Ser. No. 146,086
22 Claims. (Cl. 103—25)

The present application is a continuation of our co-pending application Serial No. 842,110, filed September 24, 1959, now abandoned.

This invention relates generally to prime mover control systems, and more particularly to an automatic system for an electric motor-driven pump apparatus for use at well installations.

In many oil well installations the amount of liquid entering the well from a productive earth formation is less than the amount of liquid that can be readily handled by pumping equipment. When the level of the well liquid drops sufficiently, a condition known as "fluid pound" will exist. The reciprocating member, or traveling valve, of the usual type of well pump will pound the surface of the fluid; the pump, sucker rods that may be associated therewith, and pumping equipment at the earth's surface may be seriously damaged if fluid pound is allowed to continue for extended periods of time. Furthermore, a substantial amount of power will be consumed by the pumping equipment, in return for which relatively little crude oil will be pumped to the earth's surface.

Manifestly, it is desirable to stop the pump as soon as possible after fluid pound begins to assume serious proportions. The disadvantages of manual pump control of pumping operations are obvious. Various methods and types of apparatus have been devised in the past for automatically controlling electric motor-driven well pumps, but for various reasons, all have been found to be unsatisfactory and/or unreliable.

According to one aspect of the present invention, use is made of the observation that current drawn by an electric motor driving a well pump varies considerably with variations in well liquid level over a particular interval of the operating cycle of the well pump reciprocating member. The deleterious effects of fluid pound are minimized by determining this interval for a particular installation, detecting the current during the interval, and controlling the motor in accordance with variations in the detected current. More particularly, the motor may be controlled by disconnecting it from its power source when the detected current falls below a given current, and reconnecting it to the power source only after a predetermined time interval has elapsed.

Figure 2:
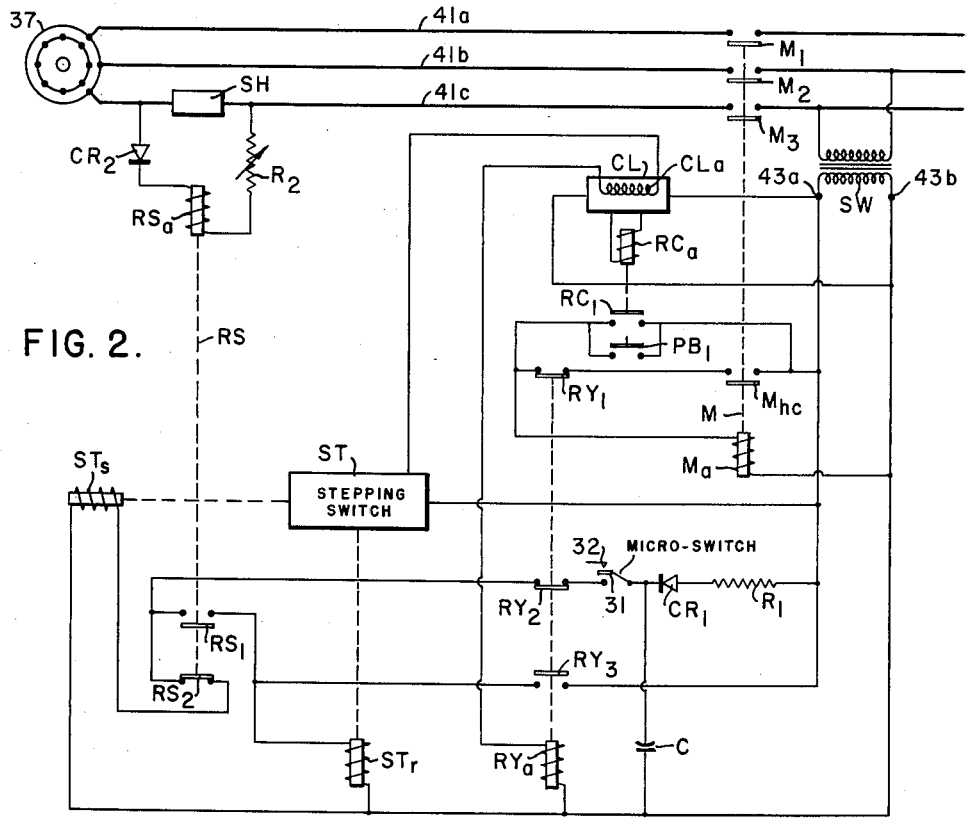
Figure 3:
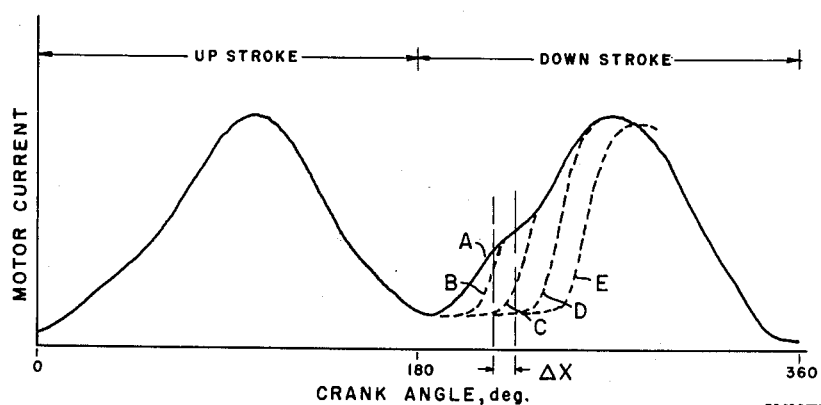

The invention will be described in detail with reference to the accompanying drawings, wherein:

FIGS. 1 and 2 are schematic diagrams illustrating an embodiment of the invention, and FIG. 3 is a Cartesian coordinate plot of motor current as a function of crank angle that is helpful in understanding the operation of the embodiment of the invention shown in FIGS. 1 and 2.

The well pump shown in FIG. 1 includes a conventional pump jack which utilizes a walking beam (or rocking beam) 3, to which a sucker rod 7 is attached by means of a horsehead 5. The walking beam 3 is driven by an electric motor 37 through a conventional mechanical drive system including a gear drive 39, a counterbalanced crank 33, and a connecting rod 35. The direction of rotation of the crank 33 is shown by arrow 34.

Sucker rod 7 extends down into the tubing 15 through a conventional wellhead assembly 10, including a stuffing box 9. The tubing is suspended within a casing 13 that is perforated in the usual manner so as to be in fluid communication with a productive earth formation 23 through perforations 21. At or near the bottom of the tubing 15 is a standing valve 19. A traveling valve 17 within the tubing is connected to the lower end of sucker rod 7 so as to reciprocate therewith within the tubing 15. The tubing 15 and standing valve 19 may be considered to be the stationary member of the down-the-hole portion of the pump, and the traveling valve 17 may be considered to be the reciprocating member thereof. Alternatively, a more usual insert-type pump may be utilized. The operation of the traveling valve and standing valve in a well pump is known and will not be further described herein.

Manifestly, as the walking beam 3 rocks on its axis, traveling valve 17 will reciprocate up and down within the tubing or pump barrel to pump liquid to the earth's surface. Should the rate at which liquids are pumped exceed the rate of flow of formation liquids into the casing, the liquid level within the tubing or pump barrel will fall below the top of the travel path of the bottom of traveling valve 17. The velocity of the traveling valve as it begins its downward movement increases rapidly. Fluid pound is not particularly serious as long as the surface of the liquid within the tubing is at or near the top of the travel path of the traveling valve, but rapidly becomes serious as liquid level drops.

Variations in motor current with rotation of crank 33 for various liquid levels are shown in FIG. 3. Curve A represents the current drawn by the motor over a single pumping cycle when the level of the liquid is above the topmost position reached by the traveling valve. Curve B represents the variation of motor current when the liquid level is slightly below the topmost position of the traveling valve. Curves C, D, and E represent the variations in current drawn by the motor as the liquid level within the tubing progressively falls. It has been found that by detecting the current drawn by the motor during the interval $\Delta X$ and controlling the operation of the motor in accordance with variations in current during this interval, the deleterious effects of fluid pound can be minimized.

Referring again to FIG. 1, there is shown apparatus for detecting the interval $\Delta X$. This may comprise a microswitch 31 having an actuating arm 32, a rod 25, and coil spring 27 connected between the walking beam 3 and a flange 28 on pump jack support member 26. Rod 25 includes a flange 29 for engaging microswitch actuating arm 32. The microswitch 31 is of the type that is momentarily closed when the actuating arm is engaged by a downwardly traveling member, but is not closed when the actuating arm is engaged by an upwardly traveling member. In other words, when flange 29 contacts actuating arm 32 while the flange is moving downwardly, the microswitch 31 will be momentarily closed; however, when the flange 29 is moving upwardly, the contacts of the microswitch will remain open.

The apparatus shown in FIGS. 1 and 2 will be best understood from a description of the operating cycles thereof. To start the motor, push button $PB_1$ may be momentarily closed to complete a circuit between terminals 43a and 43b of transformer secondary winding SW through motor contactor actuating winding M. Normally open motor contactors $M_1$, $M_2$, $M_3$, and $M_{hc}$ completes a circuit through contact $R_{y1}$ and energizing coil M to keep the motor contactor closed after push button $PB_1$ is released. Closure of contacts $M_1$, $M_2$, and $M_3$ energizes the windings of motor 37 from a source of electrical power (not shown) through lines 41a, 41b, and 41c.

It is to be noted that terminals 43a and 43b will be energized whether or not contacts $M_1$, $M_2$, and $M_3$ are closed inasmuch as primary winding PW is connected directly to the electrical power source. Motor 37 may be a conventional three-phase electric motor for well pump installations. As the pump jack rocks on its axis, microswitch 31 will be closed on each downstroke of the traveling valve during the interval $\Delta X$. As long the liquid level in tubing 15 is high, the current drawn by motor 37 will produce a large voltage drop across shunt SH so that the current flowing through actuating winding $RS_a$, rectifier $CR_2$, and variable resistor $R_2$ is sufficiently large to actuate relay RS, thus closing contact $RS_1$ and opening normally closed contact $RS_2$.

Stepping switch ST is provided with a stepping winding $ST_s$ and a reset winding $ST_r$. The stepping switch is of conventional design and is adapted to close when stepping switch $ST_s$ has been energized a predetermined number of times without reset winding $ST_r$ having been energized. Energization of reset winding $ST_r$ will always set stepping switch ST in its initial position. The stepping switch includes contacts, not shown, which will be closed to complete a circuit between terminals 43a and 43b through clock actuating winding $CL_a$ and relay winding $RY_a$.

As long as the current drawn by the motor is large enough to actuate relay RS so that contact $RS_1$ is closed, each closure of microswitch 31 over the interval $\Delta X$ will energize reset winding $ST_r$ by virtue of discharge of capacitor C which is charged through resistor $R_1$ and half wave rectifier $CR_1$ from transformer secondary terminals 43a and 43b. However, when the current drawn by motor 37 fails below a critical value when the liquid within tubing 15 drops to a dangerous level, relay RS will drop out to open contact $RS_1$ and close contact $RS_2$. Each closure of microswitch 31 thereafter during the interval $\Delta X$ of the pumping cycle will energize stepping winding $ST_s$. After stepping winding $ST_s$ has been energized during a predetermined number of consecutive downstrokes of the traveling valve, the contacts of stepping switch ST will be closed to energize relay winding $RY_a$ and clock winding $CL_a$. When winding $RY_a$ is energized, contacts $RY_1$ and $RY_2$ will be opened and contact $RY_3$ will be closed. Motor contactor winding $M_a$ will be de-energized to open contacts $M_1$, $M_2$, $M_3$, and $M_{hc}$, de-energizing the windings of motor 37, and stopping the pump. Closure of contact $RY_3$ will immediately energize reset winding $ST_r$ to reset the stepping switch to its initial position. The opening of contact $RY_2$ will make it impossible for microswitch 31 to energize stepping winding $ST_s$ or reset winding $ST_r$ until the motor windings have been energized again. Energization of clock winding $CL_a$ will begin the timing cycle of clock CL. After a predetermined interval, clock CL will energize winding $RC_a$ to momentarily close contact $RC_1$ and energize winding $M_a$. Contactor M will pull in to close contacts $M_1$, $M_2$, $M_3$, and $M_{hc}$ and initiate another pumping cycle.

The function of resistor $R_2$ is to set the current through winding $RS_a$ at which relay RS will pull in. Manifestly, the current at which RS will pull in is determined by the current drawn by the motor 37 so that resistor $R_2$ in effect determines the minimum level to which the liquid in tubing 15 may drop before the pump is stopped.

Contact $RC_1$ should be closed by clock CL for an interval sufficient for relay RS to pull in so that the motor will continue operating. Ordinarily, a time interval of 10 or 15 seconds should be sufficient for this purpose.

The angle $\Delta X$ over which microswitch 31 is closed may be a 10 to 20 degree angle occurring between 180 and 270 degrees of crank angle during the downstroke of the traveling valve, assuming vertical crank pointing in the upward direction as zero degrees. This interval will vary somewhat for various installations and may be readily determined by measurement of motor current as a function of valve position or crank angle for various levels of liquid in the tubing or pump barrel. Most conveniently, current measurements may be taken while the pump is operating with the liquid level at the point where fluid pound begins to be objectionable. Microswitch 31 may be moved up and down until the most satisfactory position thereof is determined.

Other types of well pumps can be used to practice the invention. For instance, a hydraulically actuated down-the-well pump of the type manufactured by the Sargent Engineering Company of Los Angeles, California, may be utilized. For such installations the apparatus for detecting the interval $\Delta X$ may be associated with the reciprocating pump member down the well.

The apparatus for detecting the interval $\Delta X$ may be positioned at other locations on the pump jack. For example, the microswitch 31 may be actuated by a suitable actuating mechanism connected to crank 33 or to the crank shaft, such as a cam attached to the crank shaft so as to actuate the microswitch 31 over the desired crank angle $\Delta X$.

The stepping switch may be actuated upon each energization of the stepping winding $ST_s$ so that the motor will be stopped as soon as the liquid level falls to the point required to drop out relay RS. However, it is usually more satisfactory to allow the traveling valve to reciprocate at least 10 or 15 times before closing the contact of stepping switch ST. When the apparatus is designed in this manner, temporary variations in the rate at which liquids are flowing into the well from surrounding earth formations will not stop the pump.

The interval during which clock CL is timing out before energization of winding $RC_a$ will vary from well installation to well installation, depending upon such factors as formation deliverability and pump capacity. However, an interval of from 30 minutes to several hours will be found to be most satisfactory.

The motor control system described above is most advantageous in that maximum pumping efficiency may be obtained while minimizing damage to well pump components. Considerable variations in the rate at which formation liquids flow into a well will not affect the operation of the control apparatus. After the resistance of resistor $R_2$ and the duration of current detection internal $\Delta X$ have been determined, it will be found that no further adjustments of the circuit variables are necessary. The apparatus is virtually fool-proof and free of maintenance problems.

The invention is not to be restricted to the specific structural details, arrangement of parts, or circuit connections herein set forth, as various modifications thereof may be effected without departing from the spirit and scope of this invention.

What is claimed is:
1. A motor control system for the control of an electric motor operatively connected to a well pump having a stationary member and a reciprocating member adapted to pump liquid from a well, comprising:
    first control means for connection to the pump, for producing a pump position indication at a predetermined position of the reciprocating member during the downstroke thereof;
    second means operatively connected to said first means, and for connection in circuit relationship with the motor, responsive to a pump position indication of said first means to disconnect the motor from its electrical power source whenever the current drawn by the motor is less than a predetermined current when the reciprocating member is at said predetermined position of its operating cycle; and third means electrically coupled to said second means responsive to disconnection of the motor from its electrical power source by said second means to reconnect the motor to its electrical power source a predetermined time interval after the motor has been disconnected from its electrical power source.

2. A motor control system for the control of an electrical motor for driving a well pump having a stationary member and a reciprocating member adapted to pump liquid from a well, comprising:

a first electrical switch;

first control means for operative connection to the pump, for momentarily closing said first electrical switch at a predetermined position of the reciprocating member during the downstroke thereof;

first and second electrical terminals adapted to be energized by an electrical power source;

a motor contactor for connection to an electric motor for connecting the motor windings to an electrical power source, said contactor having a first actuating winding, a normally open holding contact, and normally open motor connection contacts;

a recitifier and capacitor serially coupled between said first and second electrical terminals so as to charge said capacitor when said terminals are energized;

a first relay having a second actuating winding, a first normally open contact, and a second normally closed contact;

means coupled to said second actuating winding and for connection to the motor windings, adapted to actuate said first relay when the current drawn by said motor is greater than a predetermined current, to close said first contact and open said second contact;

a stepping relay having second and third actuating windings and a third normally open contact, said stepping relay being adapted to close said third contact only after said second winding has been energized a predetermined number of times, and to reset said third contact to its original open position upon energization of said third winding;

second relay means having a fourth actuating winding, fourth and fifth normally closed contacts, and a sixth normally open contact;

said third contact and said fourth actuating winding being serially connected between said first and second terminals so that said fourth actuating winding will be energized by closure of said third contact;

said first switch, said second and fourth contacts, and said second actuating winding being connected across said capacitor so that said capacitor can discharge therethrough to energize said second actuating winding;

said second contact and said third actuating winding being serially connected across said first contact and said second actuating winding to energize said third winding when said first switch and said third and fourth contacts are simultaneously closed;

said sixth contact and said third winding being serially connected between said first and second terminals to energize said third winding upon actuation of said second relay;

said fifth contact and said holding contact being serially connected with said first actuating winding between said first and second terminals to energize said first winding when said fourth winding is de-energized and said first winding has been energized to close said holding contact; and a timing means in circuit relationship with said fourth actuating winding responsive to energization of said fourth actuating winding to energize said first actuating winding a predetermined time interval after energization of said fourth actuating winding until said holding contact has been closed.

3. A motor control system for the control of an electric motor for driving a well pump having a stationary member and a reciprocating member adapted to pump liquid from a well, comprising:

a motor contactor for connection to the windings of said motor adapted, when actuated, to connect the motor windings to an electrical power source;

time delay means having a control circuit for momentarily actuating said contactor a predetermined time interval after at least momentary energization of said control circuit;

second means for connection in circuit relationship with said motor contactor for holding said contactor in its actuated position after momentary actuation of said contactor by said first means;

switch means operatively connected to said reciprocating member adapted to momentarily close at a predetermined position of said reciprocating member during the downstroke thereof;

a stepping relay having a contact member, a stepping winding, and a reset winding adapted to close said contact member when said stepping winding has been energized a predetermined number of times without said reset winding having been energized;

circuit means in circuit relationship with the motor windings, said switch means, and said stepping relay winding, adapted to energize said stepping winding upon closure of said switch means when the motor current is less than a given current, and further adapted to energize said reset winding upon closure of the switch means when the motor current is at least a given current; and third means in circuit relationship with said stepping relay, said control circuit, and said motor contactor, responsive to closure of said stepping relay contact member to deactuate said motor contactor and to energize said control circuit and said stepping relay reset winding.

4. A motor control system for the control of an electric motor for driving a well pump having a stationary member and a reciprocating member adapted to pump liquid from a well, comprising:

a motor contactor for connection to the windings of said motor adapted, when actuated, to connect the motor windings to an electrical power source;

time delay means having a control circuit for momentarily actuating said contactor a predetermined time interval after at least momentary energization of said control circuit;

second means for connection in circuit relationship with said motor contactor for holding said contactor in its actuated position after momentary actuation of said contactor by said first means;

switch means operatively connected to said reciprocating member adapted to momentarily close at a predetermined position of said reciprocating member during the downstroke thereof;

a stepping relay having a contact member;

a stepping winding, and a reset winding, adapted to close said contact member when said stepping winding has been energized a predetermined number of times without said reset winding having been energized;

a capacitor;

means coupling the electrical power source to said capacitor for charging said capacitor;

circuit means in circuit relationship with the motor windings, said switch means, said capacitor, and said stepping relay winding adapted to discharge said capacitor through said stepping winding upon closure of said switch means when the motor current is less than a given current, and further adapted to discharge said capacitor through said reset winding upon closure of said switch means when the motor current is at least a given current; and means in circuit relationship with said stepping relay, said control circuit, and said motor contactor responsive to closure of said stepping relay contact member to deactuate said motor contactor and to energize said control circuit and said stepping relay reset winding.

5. A motor control system for the control of an electric motor for driving a well pump having a stationary member and a reciprocating member adapted to pump liquid from a well, comprising:

a motor contactor for connection to the windings of said motor adapted, when actuated, to connect the motor windings to an electrical power source;

time delay means having a control circuit for momentarily actuating said contactor a predetermined time interval after at least momentary energization of said control circuit;

second means for connection in circuit relationship with said motor contactor for holding said contactor in its actuated position after momentary actuation of said contactor by said first means;

switch means operatively connected to said reciprocating member adapted to momentarily close at a predetermined position of said reciprocating member during the downstroke thereof;

first circuit means having a stepping control circuit, a reset control circuit, and a circuit closing member, adapted to actuate said circuit closing member to close a circuit connected thereto when said stepping control circuit has been energized a predetermined number of times without said reset control circuit having been energized;

second circuit means in circuit relationship with said first control means, said first circuit means and the motor adapted to energize said stepping control circuit responsive to output indications of said first control means when the motor current is less than a given current, and further adapted to energize said reset control circuit responsive to output indications of said first control means when the motor current is at least said given current; and means in circuit relationship with said first circuit means, said time delay means, and said motor contactor, responsive to closure of said circuit closing member to deactuate said motor contactor and energize said time delay means control circuit and said reset control circuit.

6. A motor control system for the control of an electric motor driving a well pump including a rocking beam connected to a sucker-rod actuated subsurface pump, comprising:

first means for connection to the well pump for detecting a predetermined position of said rocking beam during each downstroke of the end of the rocking beam connected to said subsurface pump and for producing a pump position indication thereupon;

second means electrically coupled to said first means and for connection to the motor responsive to a pump position indication of said first means to sample the current drawn by the motor at said predetermined position of said rocking beam during each downstroke, and to produce an output signal when the sample current is less than a predetermined value;

third means electrically coupled to the motor and to said second means respective to a predetermined number of output signals from said second means on consecutive downstrokes of said rocking beam to produce an output signal;

fourth means connected to said third means and to the motor responsive to each output signal from said third means to disconnect the motor from its source of electrical power; and means electrically coupled to said fourth means responsive to disconnection of the motor from its source of electrical power to reconnect the motor to its source of electrical power a predetermined time interval after the motor has been disconnected from its source of electrical power.

7. A method of operating an electric motor-driven well pump having a stationary member and a reciprocating member adapted to pump liquid from a well, comprising:

measuring the current drawn by the motor during the downstroke of the reciprocating member when the liquid level in the well is at least at the top of the path traversed by the reciprocating member;

measuring current drawn by the motor during a portion of the downstroke of the reciprocating member shortly after the beginning of the downstroke, when the liquid level in the well is at a point whereat objectionable fluid pound begins, to establish a reference current;

detecting the current drawn by the motor on every downstroke of the reciprocating member; decoupling the motor from its electrical power source for a predetermined time interval when the current drawn by the motor is less than the reference current; and reconnecting the motor to its electrical power source at the end of the time interval.

8. A method of operating an electric motor-driven well pump having a stationary member and a reciprocating member adapted to pump liquid from a well, comprising:

measuring the current drawn by the motor during the downstroke of the reciprocating member with the surface of the liquid in the well at various levels within the path traversed by the bottom of the reciprocating member to determine a reference position of the reciprocating member whereat motor current changes rapidly with variations in liquid level;

detecting the current drawn by the motor at said reference position of said reciprocating member during each downstroke thereof;

disconnecting the motor from its source of electrical power for a predetermined time interval when the detected current falls below a predetermined current; and reconnecting the motor to its source of electrical power at the end of the time interval.

9. A method of operating an electric motor-driven well pump having a stationary member and a reciprocating member adapted to pump liquid from a well, comprising:

measuring the current drawn by the motor during the downstroke of the reciprocating member with the surface of the liquid in the well at various levels within the path traversed by the bottom of the reciprocating member to determine a reference position of the reciprocating member whereat motor current changes rapidly with variations in liquid level;

detecting the current drawn by the motor at said reference position of said reciprocating member during each downstroke thereof;

disconnecting the motor from its source of electrical power for a predetermined time interval when the detected current falls below a predetermined current for a predetermined number of consecutive downstrokes of said reciprocating member; and reconnecting the motor to its source of electrical power at the end of the time interval.

10. The method of claim 9 wherein the time interval is at least 30 minutes.

11. A control system for a prime mover operatively connected to a cyclically operating reciprocating work member, comprising:

first means for connection to the work member adapted to produce a work member position indication when the work member is at a predetermined position on alternate strokes of its operating cycle;

measuring means for measuring a variable characteristic of the prime mover; and second means connected to said measuring means and to said first means, responsive to the work member position indication of said first means to alter the speed of the prime mover for a predetermined time interval when the measured operating characteristic reaches a predetermined value.

12. A control system for a prime mover operatively connected to a cyclically operating reciprocating work member, comprising:

first means for connection to the work member adapted to produce a work member position indication when the work member is at a predetermined position on alternate strokes of its operating cycle;

measuring means for measuring a variable characteristic of the prime mover;

second means connected to said measuring means and to said first means, responsive to the work member position indication of said first means to alter the speed of the prime mover when the measured operating characteristic reaches a predetermined value; and means electrically connected to said second means responsive to alteration in the speed of said prime mover to restore the prime mover to its original speed after a predetermined time interval.

13. A motor control system for the control of a well pump having a stationary member and a reciprocating member, comprising:

first means for connection to the well pump adapted to produce a pump position indication when the reciprocating member is at a predetermined position in the downstroke of its operating cycle;

measuring means for measuring a variable characteristic of the motor; and second means connected to said measuring means and to said first means responsive to the pump position indication from said first means to alter the speed of the motor for a predetermined time interval when the measured operating characteristic reaches a predetermined value.

14. A motor control system for the control of a well pump having a stationary member and a reciprocating member, comprising:

first means for connection to the well pump adapted to produce a pump position indication when the reciprocating member is at a predetermined position in the downstroke of its operating cycle;

measuring means for measuring a variable characteristic of the motor; and second means connected to said measuring means and to said first means, responsive to the pump position indication from said first means to disconnect the motor from its electrical power source when the measured operating characteristic reaches a predetermined value.

15. A motor control system for control of a well pump having a stationary member and a reciprocating member, comprising:

first means for connection to the well pump adapted to to produce a pump position indication when the reciprocating member is at a predetermined position in the downstroke of its operating cycle;

measuring means for measuring a variable characteristic of the motor;

second means connected to said measuring means and to said first means, responsive to the pump position indication from said first means to disconnect the motor from its electrical power source when the measured operating characteristic reaches a predetermined value; and means electrically connected to said second means, responsive to disconnection of the motor from its electrical power source by said first means to reconnect the motor to its electrical power source a predetermined time interval after the motor has been disconnected from its electrical power source.

16. A motor control system for the control of an electric motor driving a well pump including a rocking beam connected to a sucker rod actuated subsurface pump, comprising:

first means for operative connection to said well pump for producing a pump position indication at a predetermined position of the well pump during the downstroke of the subsurface pump;

circuit means connected to the first means and responsive to each pump position indication thereof to measure current drawn by the motor for a predetermined interval after said each pump position indication, and for disconnecting the motor from its source of electrical power when the measured current falls below a predetermined minimum value; and means electrically connected to said circuit means responsive to disconnection of the motor from its source of electrical power by said second means to reconnect the motor to its source of electrical power a predetermined time interval after the motor has been disconnected from its source of electrical power.

17. A motor control system for the control of an electric motor driving a well pump including a rocking beam connected to a sucker rod actuated subsurface pump, comprising:

first means for operative connection to said well pump for producing a pump position indication at a predetermined position of the well pump during the downstroke of the subsurface pump; and circuit means connected to said first means and responsive to each pump position indication thereof to measure current drawn by the motor for a predetermined interval thereafter, and for disconnecting the motor from its source of electrical power for a predetermined time interval when the measured current falls below a predetermined minimum value.

18. In a well installation comprising a pump for lifting liquid to the earth's surface, and electric motor connected to said pump to drive said pump, and a power circuit connected to the motor to energize said pump, the combination comprising:

first means for operative connection to the motor and to the pump adapted to detect the current drawn by the motor during a predetermined portion of the operating cycle of the pump;

second means connected to said first means responsive to detection by said first means of a current less than the predetermined current during a predetermined number of successive operating cycles of the pump, adapted to disconnect the motor from the power circuit; and means coupled to said second means adapted to reconnect the motor to said power circuit after a predetermined time interval.

19. For use in a well pumping system including an electric motor-driven, reciprocating well pump and a pump position indicator for producing a pump position indication during alternate cycles of operation of the pump, a motor control system for the electric motor including:

first switch means for connecting the motor to an electrical source;

first circuit means, including a control means therefor, connected to said first switch means for opening said first switch means to disconnect the motor from the electrical source for a predetermined time interval responsive to energization of said control means;

measuring circuit means for measuring a characteristic of the current drawn by the motor; and second circuit means connected to said measuring circuit means, to said pump position indicating means, and to said first circuit means for energizing said control means when the current characteristic measured by said measuring circuit means is of a predetermined value during reception of each of a predetermined number of consecutive pump position indications by said second circuit means.

20. For use in a well pumping system including an electric motor-driven, reciprocating well pump and a pump position indicator for producing a pump position indication during alternate cycles of operation of the pump, a motor control system for the electric motor including:

first switch means for connecting the motor to an electrical source;

first circuit means, including a control means therefor, connected to said first switch means for opening said first switch means for a predetermined time interval responsive to energization of said control means;

measuring circuit means for measuring a characteristic of the current drawn by said motor; and means including second switch means, connected in circuit relationship with said control means of said first switch means, said second switch means including a stepping actuator for connection to said pump position indicator and connected in circuit relationship with said measuring circuit means for stepping said second switch means from an initial position thereof to a closed position thereof responsive to a predetermined number of consecutive pump position indications when the current characteristic measured by said measuring circuit is of a predetermined magnitude;

said means including second switch means being operable upon closure of said second switch means to energize said control means.

21. For use in a well pumping system including an electric motor-driven, reciprocating well pump and a pump position indicator for producing a pump position indication during alternate cycles of operation of the pump, a motor control system for the electric motor including:

first switch means for connecting the motor to an electrical source;

first circuit means, including a control means therefor, connected to said first switch means for opening said first switch means responsive to energization of said control means;

measuring circuit means for measuring a characteristic of the current drawn by said motor;

means including second switch means connected to said control means of said first switch means, said second switch means including a stepping actuator for connection to said pump position indicator and connected in circuit relationship with said measuring circuit means for stepping said second switch means from an initial position thereof to a closed position thereof responsive to a predetermined number of consecutive pump position indications when the current characteristics measured by said measuring circuit is of a predetermined magnitude;

said means including second switch means being operable upon closure of said second switch means to energize said control means; and means including a clock switch connected to said first circuit means and to said first switch means, adapted to close said first switch means a predetermined time interval after energization of said control means.

22. For use in a well pumping system including an electric motor-driven, reciprocating well pump and a pump position indicator for producing a pump position indication during alternate cycles of operation of the pump, a motor control system for the electric motor including:

first switch means for connecting the motor to an electrical source;

first circuit means, including a control means therefor, for opening said first switch means for a predetermined time interval responsive to energization of said control means;

measuring circuit means for measuring a characteristic of the current drawn by said motor, said measuring circuit means including a relay having a first normally open contactor and a second normally closed contactor, adapted to close said first contactor and open said second contactor when the current through said measuring circuit is greater than a predetermined current; and means including second switch means connected to said control means of said first switch means, operable upon closure of said second switch means to energize said control means;

said second switch means including a first actuator for connection to the pump position indicator and connected to said first contactor for stepping said second switch means from an initial position thereof to a closed position thereof responsive to a pump position indication when said second contact means is closed, and a second actuator for connection to the pump position indicator and connected to said second contactor for resetting said second switch means to the normal position thereof responsive to a pump position indication when said second contactor is closed.

References Cited in the file of this patent

UNITED STATES PATENTS

| | | |
|---|---|---|
| 1,980,799 | Hardesty | Nov. 13, 1934 |
| 2,180,400 | Coberly | Nov. 21, 1939 |
| 2,316,494 | Tipton | Apr. 13, 1943 |
| 2,456,456 | Smith | Dec. 14, 1948 |
| 2,550,093 | Smith | Apr. 24, 1951 |
| 2,661,697 | Long et al. | Dec. 8, 1953 |
| 2,707,440 | Long et al. | May 3, 1955 |
| 2,947,931 | Hubby | Aug. 2, 1960 |